United States Patent

[11] 3,578,075

[72] Inventor Joseph Winter
 New Haven, Conn.
[21] Appl. No. 872,154
[22] Filed Oct. 29, 1969
[45] Patented May 11, 1971
[73] Assignee Olin Corporation
 Continuation-in-part of application Ser. No.
 679,459, Oct. 31, 1967, now abandoned.

[54] CORRUGATED TUBING
 4 Claims, 7 Drawing Figs.
[52] U.S. Cl. .................................................. 165/177,
 165/179, 138/38, 138/177
[51] Int. Cl. ..................................................... F28f 1/06,
 F28f 1/10

[50] Field of Search ............................................. 138/38,
 177, 173, 122, ; 165/177, 179, 184, 174

[56] References Cited
 UNITED STATES PATENTS
 770,599  9/1904  Monteagle ..................... 138/38
 862,919  8/1907  Isaacs et al ..................... 138/173X
 1,394,311 10/1921 Lang .............................. 138/38X
 2,115,769  5/1938  Harris ............................ 138/38X Primary Examiner—Herbert F. Ross
Attorneys—Robert H. Bachman and Gordon G. Menzies ABSTRACT: The disclosure teaches an improved corrugated metal tubing having improved corrosion resistance and heat transfer characteristics. The tubing is characterized by having a plurality of lands and grooves extending helically along the circumference thereof and having in cross section a plurality of uniform, symmetrical, wavelike indentations.

INVENTOR:
JOSEPH WINTER

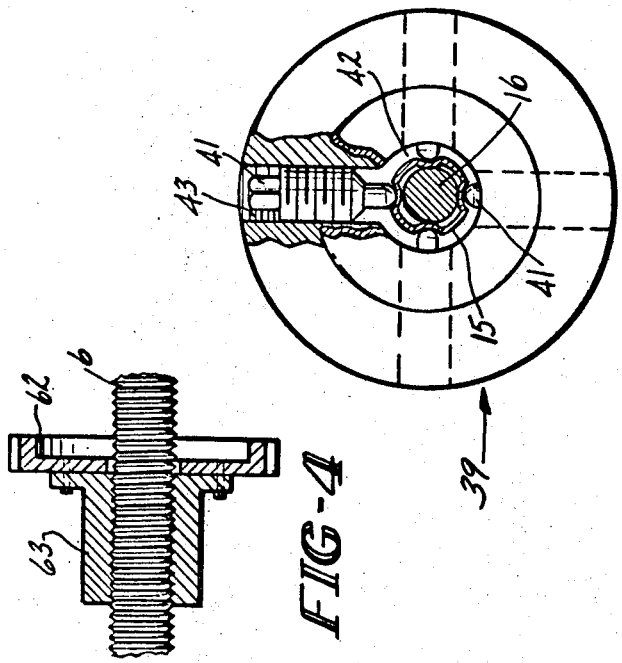
FIG-3
FIG-4
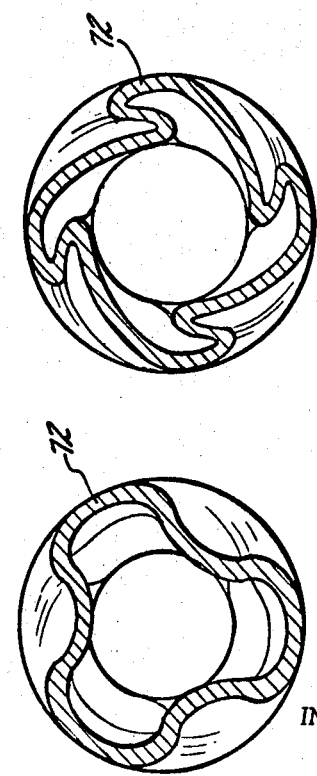
FIG-5
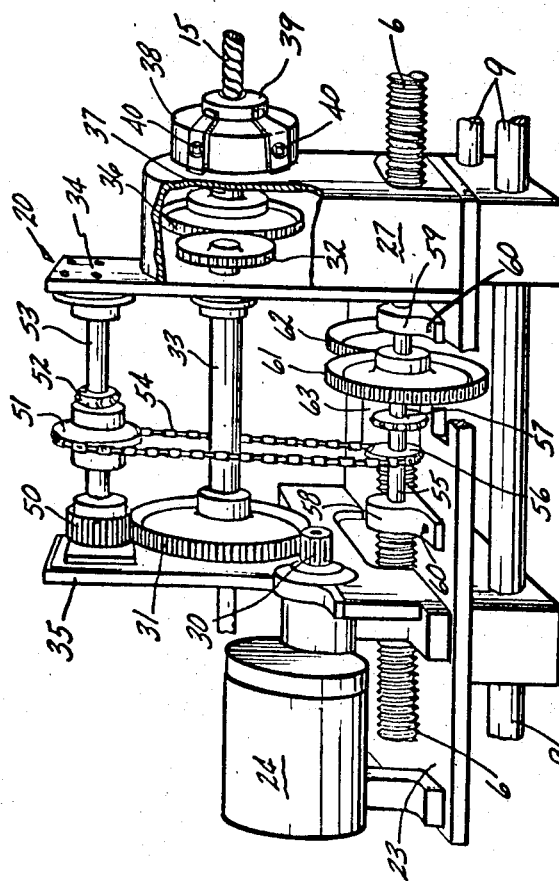
FIG-2
FIG-7
FIG-6
INVENTOR:
JOSEPH WINTER
BY Robert H. Bachman
ATTORNEY 3,578,075

CORRUGATED TUBING

This application is a continuation-in-part of copending application Ser. No. 679,459 by Joseph Winter, filed Oct. 31, 1967 now abandoned.

As is well known, corrugated metal tubing is highly desirable for a variety of purposes, in particular bellows and heat transfer applications. For example, it is well known that corrugated or ribbed tubing is capable of yielding increased thermal efficiency for heat transfer applications. This is highly advantageous in many areas, particularly in saline water distillation apparatuses in view of the increasing demand for fresh water in many areas of the world.

It is especially desirable to utilize corrugated tubing wherein the corrugations are both inside and outside the tube wall since this insures increased thermal efficiency for heat transfer by developing gross turbulent flow inside the tube in conjunction with exposing high surface area outside the tube.

Numerous methods have been suggested for achieving corrugated tubing. These methods are, however, associated with one or more significant disadvantages.

Art methods for forming helically corrugated tubing from straight-walled tubing are frequently characterized by utilizing a twisting action on the tube in association with a die plate. This method, however, has serious shortcomings.

The method is seriously limited by the geometry of the tube, particularly the wall thickness from which the tube is made and the work hardening characteristics of the tube material. Thus, the twisting methods are unsatisfactory with respect to thin walled tubing and are constrained by the work hardening capacity of the particular metal. Furthermore, these methods are significantly limited with respect to the variety of metals with which they can be used and are generally less effective with respect to welded tubing.

Twisting methods are also unsatisfactory in that they often cause significant amounts of metal flow to occur which results in localized strain markings, especially at the root of the threads. This accelerates corrosion and in cases where metal imperfections exist, this causes localized fracture.

Some art methods utilize a helically configured die plate which is rotated about the tubing. Conventionally, when these apparatuses are used, particularly on stainless steel tubing, difficulties have been encountered with seizing of the die plate and the tubing. In addition, these methods often deform the tube due to the considerable pressure of the die plate.

Accordingly, it is a principal object of the present invention to provide an improved corrugating metal tubing.

It is an additional object of the present invention to provide an improved corrugated metal tube as aforesaid which may be readily produced and which is capable of being utilized with a variety of wall thicknesses and with a variety of materials.

It is a further object of the present invention to provide an improved corrugated metal tube as aforesaid which is not limited by the work hardening characteristics of the particular metal and which may be conveniently utilized with welded tubing.

An additional object of the present invention is to provide an improved corrugated tubing which is inexpensive to produce and is characterized by increased thermal efficiency.

Further objects and advantages of the present invention will appear hereinafter.

The present invention will be further understood by reference to the following specification and drawings which form a part thereof wherein:

FIG. 2 is a side view of the inner frame of the apparatus of FIG. 1, with the cover plate removed;

FIG. 3 is a front view of a die of the apparatus of FIG. 1, with portions shown in section;

FIG. 4 is a sectional view of the gear and nut assembly of the apparatus of FIG. 1 for causing axial motion of the inner frame;

FIG. 5 is a side view of a portion of tubing produced in accordance with the present invention;

FIG. 6 is a sectional view along the lines of VI—VI of FIG. 5; and

FIG. 7 is a sectional view similar to FIG. 6 showing an alternate embodiment of the tubing of the present invention.

Figure 1:
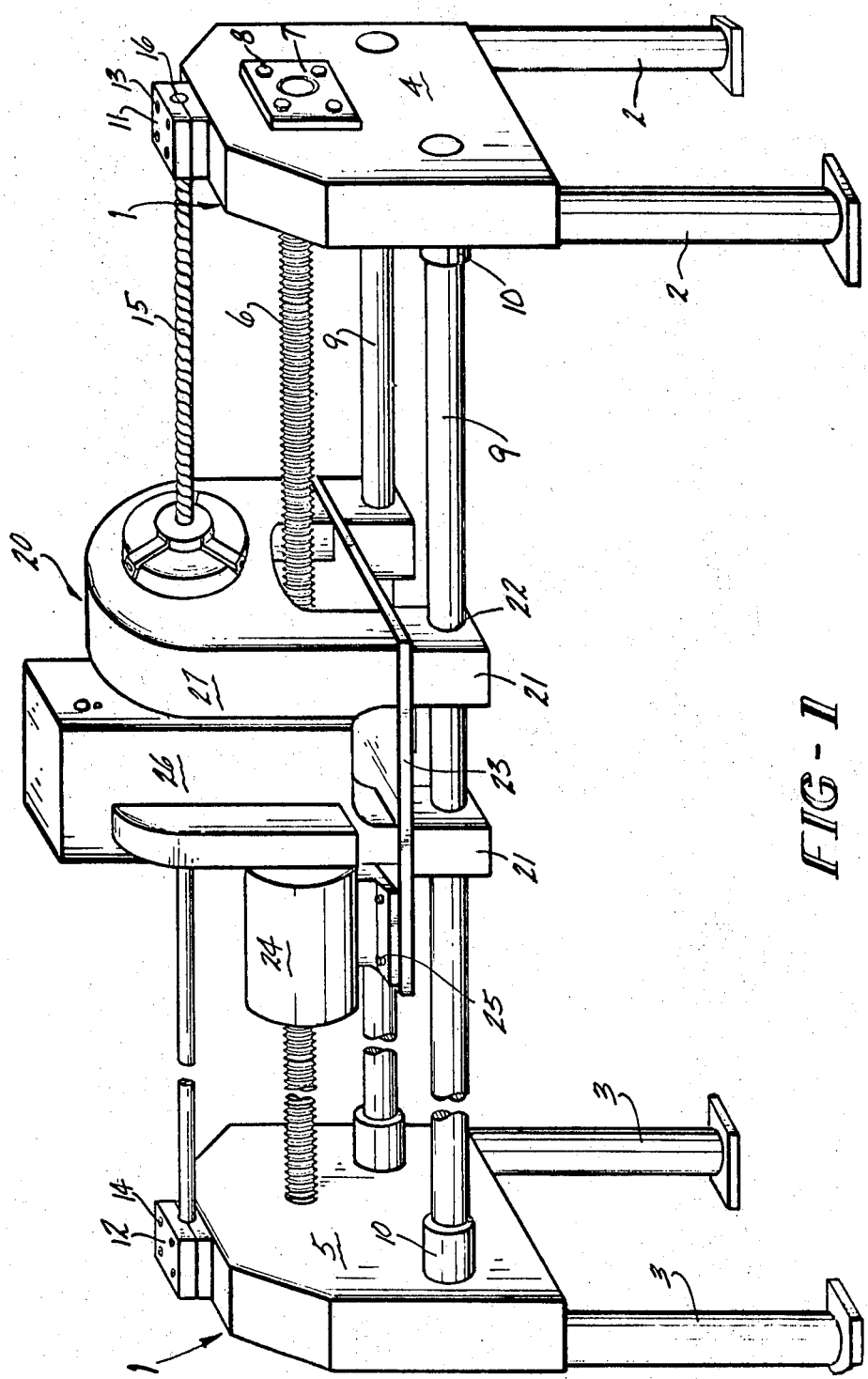
FIG. 1 is a side view of an apparatus for preparing the tubing of the present invention.

In accordance with the present invention the improved, hollow corrugated metal tubing thereof has a plurality of lands and grooves extending helically along the circumference thereof, said tube having in cross section a plurality of uniform, symmetrical, wavelike indentations, with the wall thickness of said tube being substantially the same as uncorrugated, starting material and approximately uniform throughout, said tube wall having an essentially homogenous condition of strain energy, said grooves comprising at least two independent, continuous grooves extending helically along the circumference of the tube, with each groove being in spaced relationship to each other, wherein the amplitude and configuration of the lands are symmetrical with the amplitude and configuration of the grooves, and wherein the width of the grooves is greater than the depth of the grooves. In the preferred embodiment, the lands at least partly overlap the grooves substantially throughout the extent thereof.

In order that the features of the improved tubing of the present invention may be more readily appreciated, one should consider the apparatus and method by which the tubing is prepared.

Referring to FIGS. 1 through 4, the apparatus of the present invention has an outer frame 1 having forward legs 2 and rearward legs 3. Forward end plate 4 is attached to forward legs 2 and rearward end plate 5 is attached to rearward legs 3.

Forward legs 2 and forward end plate 4 are spaced from rearward legs 3 and rearward end plate 5. Stationary feed screw 6 is affixed to forward end plate 4 via plate 7 and nuts 8 and runs from forward end plate 4 to rearward end plate 5 as shown in FIG. 1, with stationary feed screw 6 being firmly affixed to rearward end plate 5 by any desired means, such as a plate and nut similar to plate 7 and nuts 8. As shown in FIG. 1, stationary feed screw 6 runs the entire distance from forward end plate 4 to rearward end plate 5. Similarly, guide rails 9 are firmly affixed to forward end plate 4 and rearward end plat 5 by any desired means, such as clamps 10 and also run the entire distance from forward end plate 4 to rearward end plate 5.

Forward fixed clamp 11 is affixed to forward end plate 4 and rearward fixed clamp 12 is affixed to rearward end plate 5 via a plurality of screws 13 and 14, respectively. The tube 15 to be corrugated is firmly held in clamps 11 and 12. Screws 13 and 14 may be loosened to allow easy removal of the tube 15. If desired, only the forward portion of tube 15 need be held in clamp 11 and the rearward portion of tube 15 may be left free or unsecured.

In operation, a mandrel 16 shown in FIG. 3 is firmly held inside tube 15 in order to prevent collapse of hollow tube 15 during the corrugating operation and to insure that a core of fixed diameter remains open along the center of the tube. Accordingly, associated with clamps 11 and 12 are means for firmly holding mandrel 16, not shown. For example, clamp 11 may have a larger rearward annular space for holding tube 15 and a smaller forward annular space for holding mandrel 16. If desired, the clamp for holding mandrel 16 may be eliminated by swaging the end of tube 15 down to the internal diameter of the mandrel. Thus, the single clamp for holding tube 15 also may serve the dual purpose of holding mandrel 16. This provides the additional advantage of having a corrugated tube with the internal inlet diameter and/or internal outlet diameter the same as the minor internal diameter of the corrugated tube.

Outer frame 1 may be relatively moveable to enable the firm clamping of varying sized tubing, i.e., forward legs 2 and forward end plate 4 may be moveable relative to rearward legs 3 and rearward end plate 5. Alternatively, or in addition, rearward clamp 12 may be provided with a forwardly extending section for holding shorter sections of tubing.

Inner frame 20 is moveably mounted on outer frame 1 in any desired manner, for example, with downwardly projecting legs 21 riding on guide members 9. A preferred construction is to have guide members 9 pass through annular openings 22 in downwardly projecting legs 21. Table 23 sits on top of downwardly projecting legs 21 and is firmly affixed thereto. High speed, high torque motor 24 is clamped to table 23 by nuts 25. Means for activating motor 24 are provided, not shown. Cover plates 26 and 27 are removably mounted on table 23 to protect the internal mechanism.

FIG. 2 shows the inner frame assembly with rearward cover plate 26 removed and with portions of forward cover plate 27 broken away.

As can be seen from FIG. 1, both the tube 15 and the stationary feed screw 6 pass through the inner frame 20.

The operation of the mechanism of the inner frame 20 is as follows. The high speed, high torque motor 24 drives gear 30 which drives gear 31. Gear 31 in turn drives gear 32 through counter shaft 33. Counter shaft 33 is carried between fixed forward plate 34 and fixed rearward plate 35 which in turn are mounted on table 23.

Gear 32 in turn drives gear 36 which rotates an integral hollow shaft 37. Shaft 37 drives holding chuck 38 which holds spring die 39 seen in more detail in FIG. 3. Shaping die 39 is rotatably mounted by any desired means, such as a standard three-jawed chuck arrangement shown in FIG. 2. Thus, when jaws 40 are loosened the shaping die may be removed.

The rotatably mounted die 39 contains removably-shaped die members 41 which project into annular opening 42 and are seated in chambers 43. As can be seen in FIG. 3, a plurality of shaped die members 41 are used which are preferably shaped nose screws. The shaped die members 41 thus may be readily removed from chambers 43. Annular opening 42 is preferably a central annular opening. Tube 15 carrying a mandrel 16 passes through annular opening 42.

Means may be provided through a cam action to insure uniform penetration of members 41 into tube 15. This can be done either with the system stationary or concurrent with the start of rotation and advance. The latter can create a gradual, smooth approach to the final configuration desired.

In operation, tube 15 is inserted through die 39 with shaped die members 41 loosened. Shaped die members 41 are then tightened so that they indent tube 15 to the desired depth. Die 39 then rotates as the entire inner frame assembly 20 moves towards rearward end plate 5.

If desired, naturally, various die members may be provided to utilize 2, 3, 4 or more shaped die members 41 projecting into tube 15 in order to provide a 2, 3, 4 or more lead corrugated tube. The preferred embodiment uses at least 3 leads, with 3 or 4 leads being most preferred. It is preferred, naturally, that the shaped die members 41 be symmetrically arranged around the periphery of the die 39.

It is a principal advantage of the present invention that axial movement of inner frame 20 is achieved synchronously with rotational movement of die 39. This may be achieved in the following manner.

Gear 31 also drives gear 50. Gear 50 drives sprocket gears 51 and 52 through counter shaft 53. Counter shaft 53 is mounted between fixed plates 34 and 35.

As shown in FIG. 2, sprocket gear 51 holds chain drive 54 which rotates counter shaft 55 via sprocket gear 56 offset from sprocket gear 51. The provision of two different sized sprocket gears 51 and 52 is to enable the use of more than one chain drive. Naturally, three or more varying sized sprocket gears may be provided. Thus when one changes the chain and sprocket gear relationship, one will change the ratio of axial to rotational movement, and, as will be seen hereinafter, one will thereby change the pitch and lead of the corrugations on the tube without changing the number of corrugations or threads per lead, i.e., the length of travel for one revolution is changed without changing the amplitude or number of threads. Thus, sprocket gear 56 mates with and is offset from sprocket gear 51 and carries chain drive 54. Sprocket gear 52 mates with and is offset from sprocket gear 57 which may carry a chain drive when chain drive 54 is removed in order to alter the speed of the inner frame assembly.

Thus, it will be seen that the apparatus of the present invention rotates a forming die with the desired number of protrusions arranged uniformly around the circumference of the tubing to be corrugated. When the die is rotated along with axial motion, there is generated a configuration best described as a multiple lead screw wherein the number of leads is the number of protrusions and wherein the configuration of the thread is a function of the shape of the protrusions and wherein the pitch and lead is the function of the axial motion synchronized with the aforementioned rotation.

Counter shaft 55 is mounted on clamps 58 and 59 which are bolted to table 23 via bolts 60. Counter shaft 55 drives gear 61 which is mated to and drives gear 62. Rotating nut 63 is fixed to gear 62, shown clearly in FIG. 4. Nut 63 rotates around fixed screw 6 and causes the axial motion of inner frame 20, thereby achieving the aforementioned synchronization of axial motion with rotational motion of the die member 39.

As can be seen from FIGS. 5, 6, and 7, the apparatus of the present invention attains a hollow corrugated tube having numerous highly desirable characteristics.

Thus, the corrugated tube 15 has a plurality of lands 70 and grooves 71 extending helically around the circumference thereof. The tube 15 has in cross section a plurality of uniform, symmetrical wavelike indentations 72.

It should be noted that the wall thickness of the corrugated tube is approximately uniform throughout and grooves 71 comprise a plurality of independent, continuous grooves extending helically along the circumference of tube 15, with each groove being in fixed spaced relationship to each other groove. The number of grooves depends upon the number of shaped die members 41 which are used. Thus, FIGS. 5 and 6 show a tube attained with the use of three shaped die members 41 and thus having three independent, continuous grooves 71 extending radially. FIG. 7 shows a cross section of a tube attained with four shaped die members 41 and thus having four independent, continuous grooves 71.

It is noted that the tube shown in FIG. 7 has uniform symmetrical wavelike indentations 72 which partly overlap. In order to have indentations which at least partly overlap, it is required that permanent twisting be superimposed on the tube while the forming is being done. The amount of twist is achieved by leaving the rear of tube 15 unrestrained and free to rotate due to the frictional forces imposed by the die. Therefore, in the embodiment of FIGS. 5 and 6, the rear of tube 15 was restrained and in the embodiment of FIG. 7, the rear of tube 15 was unrestrained. If desired, rear clamp 12 can be used as a drag brake to control the amount of twist and thereby the amount of overlap.

In addition to the foregoing the tubing of the present invention is characterized by the width of the grooves being greater than the depth of the grooves. This assures peripheral continuity of material, i.e., in order to prevent localized thinning or extensive shear-type deformation, either of which would significantly contribute to corrosion failure susceptibility.

In the preferred embodiment, the groove width should be greater than the groove depth by from 25—50 percent and should not be greater than groove depth by more than 75 percent.

For example, a 1-inch diameter tube having the configuration of FIG. 6, may representatively have a groove width of about 1 inch and a groove depth of about 0.4 inch. Measuring in the tube direction, e.g., as shown in FIG. 5, the period or distance between peaks may representatively be 0.7 inch and the total height 0.3 inch. In a 1-inch diameter tube having the configuration of FIG. 7, a representative groove width may be about 1.3 inches and a groove depth about 0.5 inch.

The tube attained in accordance with the present invention achieves significant increased heat transfer due to the increased surface area per unit length of tube and increased turbulence generated both inside and outside the tube. It is a particular advantage of the present invention that the wall thickness of the corrugated tubing is substantially uniform throughout, thus minimizing localized corrosion and local thin spots in strained areas. This is particularly significant in view of the difficulty in art methods in achieving wall thickness in highly strained areas, especially at the root of the threads. It is a particular advantage of the tubing of the present invention that the tube wall thickness of the corrugated tubing is substantially the same as the uncorrugated starting material and the undeformed ends. Furthermore, the condition of strain energy is essentially homogenous, i.e., one does not obtain localized highly stressed regions which would be galvanically anodic, thereby accelerating corrosion failure.

In addition, the apparatus of the present invention may be used on a wide variety of metals and their alloys, for example, copper and its alloys, aluminum and its alloys, titanium and its alloys, iron and its alloys and so forth. The apparatus of the present invention and resulting corrugated tube is not constrained by work hardening capacity of the metal, as are those which utilize the twisted tube concept. The apparatus of the present invention may be readily employed as long as some ductility exists in the metal.

Furthermore, the apparatus of the present invention could use a welded seam tube, even if the welded seam is weaker than the parent metal. The twisted tube concepts are limited with respect to welded seam tubes since they must transmit shear forces which may break the weld; whereas, the apparatus of the present invention applies uniform strains.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

I claim:

1. A hollow metal corrugated tube with improved corrosion resistance and heat transfer characteristics having a plurality of lands and grooves extending helically along the circumference thereof, with said lands at least partly overlapping said grooves substantially throughout the extent thereof, said tube having in cross section a plurality of uniform, wavelike indentations, each said indentation being partly overlapped by said lands, with the wall thickness of said tube being substantially the same as uncorrugated, starting material and approximately uniform throughout, said tube wall having an essentially homogeneous condition of strain energy, said grooves comprising at least three independent, continuous grooves extending helically along the circumference of the tube, with each groove being in spaced relationship to each other, wherein the amplitude and configuration of the lands are alternate with the amplitude and configuration of the grooves, and wherein the width of the grooves is greater than the depth of the grooves.

2. A tube according to claim 1 wherein said grooves comprise four independent, continuous grooves extending helically along the circumference of the tube, with each groove being in spaced relationship to each other.

3. A tube according to claim 1 having an uncorrugated end portion with the wall thickness of said uncorrugated portion being substantially equal to the wall thickness of said corrugated portion.

4. A tube according to claim 1 wherein the groove width is greater than the groove depth by from 25 to 50 percent.